US012764157B1

(12) United States Patent
Doddamani et al.

(10) Patent No.: US 12,764,157 B1
(45) Date of Patent: Oct. 13, 2026

(54) HANDLING DISTRIBUTED DENIAL-OF-SERVICE ATTACKS BASED ON CONNECT REQUESTS

(71) Applicant: Juniper Networks, Inc., Sunnyvale, CA (US)

(72) Inventors: Anand Hanumantappa Doddamani, Bangalore (IN); Shiva Kumar N, Bangalore (IN); Rakesh Kumar Sharma, Rajasthan (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 366 days.

(21) Appl. No.: 18/476,918

(22) Filed: Sep. 28, 2023

(51) Int. Cl.
*H04L 9/40* (2022.01)

(52) U.S. Cl.
CPC ........ *H04L 63/1458* (2013.01); *H04L 63/168* (2013.01); *H04L 2463/141* (2013.01)

(58) Field of Classification Search
CPC ............... H04L 63/1458; H04L 63/168; H04L 2463/141
See application file for complete search history.

(56) References Cited

U.S. PATENT DOCUMENTS

2015/0067840 A1* 3/2015 Xiang ................. H04L 63/1458 726/22
2019/0394225 A1* 12/2019 Vajipayajula ....... G06F 16/9024
2020/0236104 A1* 7/2020 Konda .................. H04L 9/0844
2021/0144161 A1* 5/2021 Mittal ................... H04L 47/827
2023/0344863 A1* 10/2023 Shashivasan ....... H04L 63/1433

* cited by examiner

*Primary Examiner* — Fatoumata Traore
*Assistant Examiner* — Carlton Johnson
(74) *Attorney, Agent, or Firm* — Harrity & Harrity, LLP

(57) ABSTRACT

A network device may receive, from an endpoint device, a first synchronize packet requesting establishment of a connection, and may receive, from the endpoint device, a connection request for connecting with a server device. The network device may provide, to the server device, a second synchronize packet requesting a connection with the server device, and may provide, to the endpoint device, a connection response indicating establishment of a session between the network device and the server device. The network device may receive, from the endpoint device, a secure sockets layer message or a non-secure sockets layer message, and may calculate a reputation score for the endpoint device based on whether the secure sockets layer message or the non-secure sockets layer message is received from the endpoint device.

20 Claims, 9 Drawing Sheets

HANDLING DISTRIBUTED DENIAL-OF-SERVICE ATTACKS BASED ON CONNECT REQUESTS

BACKGROUND

A distributed denial-of-service (DDoS) attack is a cybercrime in which an attacker floods a server device with traffic (e.g., Internet traffic) to prevent users from accessing connected online services and/or sites. A DDoS attack is a malicious attempt to disrupt normal traffic of a targeted server device, service, or network by overwhelming the target or its surrounding infrastructure with a flood of traffic.

SUMMARY

Some implementations described herein relate to a method. The method may include receiving, from an endpoint device, a first synchronize packet requesting establishment of a connection, and providing, to the endpoint device, a first synchronize acknowledgment packet acknowledging receipt of the first synchronize packet. The method may include receiving, from the endpoint device, a first acknowledgment packet in response to the first synchronize acknowledgment packet, and receiving, from the endpoint device, a connection request for connecting with a server device. The method may include providing, to the server device, a second synchronize packet requesting a connection with the server device, and receiving, from the server device, a second synchronize acknowledgment packet acknowledging receipt of the second synchronize packet. The method may include providing, to the server device, a second acknowledgment packet in response to the second synchronize acknowledgment packet, and providing, to the endpoint device, a connection response indicating establishment of a session between the network device and the server device. The method may include receiving, from the endpoint device, a secure sockets layer message or a non-secure sockets layer message, and calculating a reputation score for the endpoint device based on whether the secure sockets layer message or the non-secure sockets layer message is received from the endpoint device.

Some implementations described herein relate to a network device. The network device may include one or more memories and one or more processors. The one or more processors may be configured to receive, from an endpoint device, a first synchronize packet requesting establishment of a connection, and provide, to the endpoint device, a first synchronize acknowledgment packet acknowledging receipt of the first synchronize packet. The one or more processors may be configured to receive, from the endpoint device, a first acknowledgment packet in response to the first synchronize acknowledgment packet, and receive, from the endpoint device, a connection request for connecting with a server device. The one or more processors may be configured to provide, to the server device, a second synchronize packet requesting a connection with the server device, and receive, from the server device, a second synchronize acknowledgment packet acknowledging receipt of the second synchronize packet. The one or more processors may be configured to provide, to the server device, a second acknowledgment packet in response to the second synchronize acknowledgment packet, and provide, to the endpoint device, a connection response indicating establishment of a session between the network device and the server device. The one or more processors may be configured to receive, from the endpoint device, a secure sockets layer message or a non-secure sockets layer message, and record a network address of the endpoint device. The one or more processors may be configured to calculate a reputation score for the endpoint device based on whether the secure sockets layer message or the non-secure sockets layer message is received from the endpoint device and based on the network address of the endpoint device.

Some implementations described herein relate to a non-transitory computer-readable medium that stores a set of instructions. The set of instructions, when executed by one or more processors of a network device, may cause the network device to receive, from an endpoint device, a first synchronize packet requesting establishment of a connection, and provide, to the endpoint device, a first synchronize acknowledgment packet acknowledging receipt of the first synchronize packet. The set of instructions, when executed by one or more processors of the network device, may cause the network device to receive, from the endpoint device, a first acknowledgment packet in response to the first synchronize acknowledgment packet, and receive, from the endpoint device, a connection request for connecting with a server device. The set of instructions, when executed by one or more processors of the network device, may cause the network device to provide, to the server device, a second synchronize packet requesting a connection with the server device, and receive, from the server device, a second synchronize acknowledgment packet acknowledging receipt of the second synchronize packet. The set of instructions, when executed by one or more processors of the network device, may cause the network device to provide, to the server device, a second acknowledgment packet in response to the second synchronize acknowledgment packet, and provide, to the endpoint device, a connection response indicating establishment of a session between the network device and the server device. The set of instructions, when executed by one or more processors of the network device, may cause the network device to receive, from the endpoint device, a non-secure sockets layer message, and terminate sessions with the endpoint device and the server device based on receiving the non-secure sockets layer message from the endpoint device. The set of instructions, when executed by one or more processors of the network device, may cause the network device to calculate a reputation score for the endpoint device based on receiving the non-secure sockets layer message from the endpoint device.

DETAILED DESCRIPTION

Figure 1A:
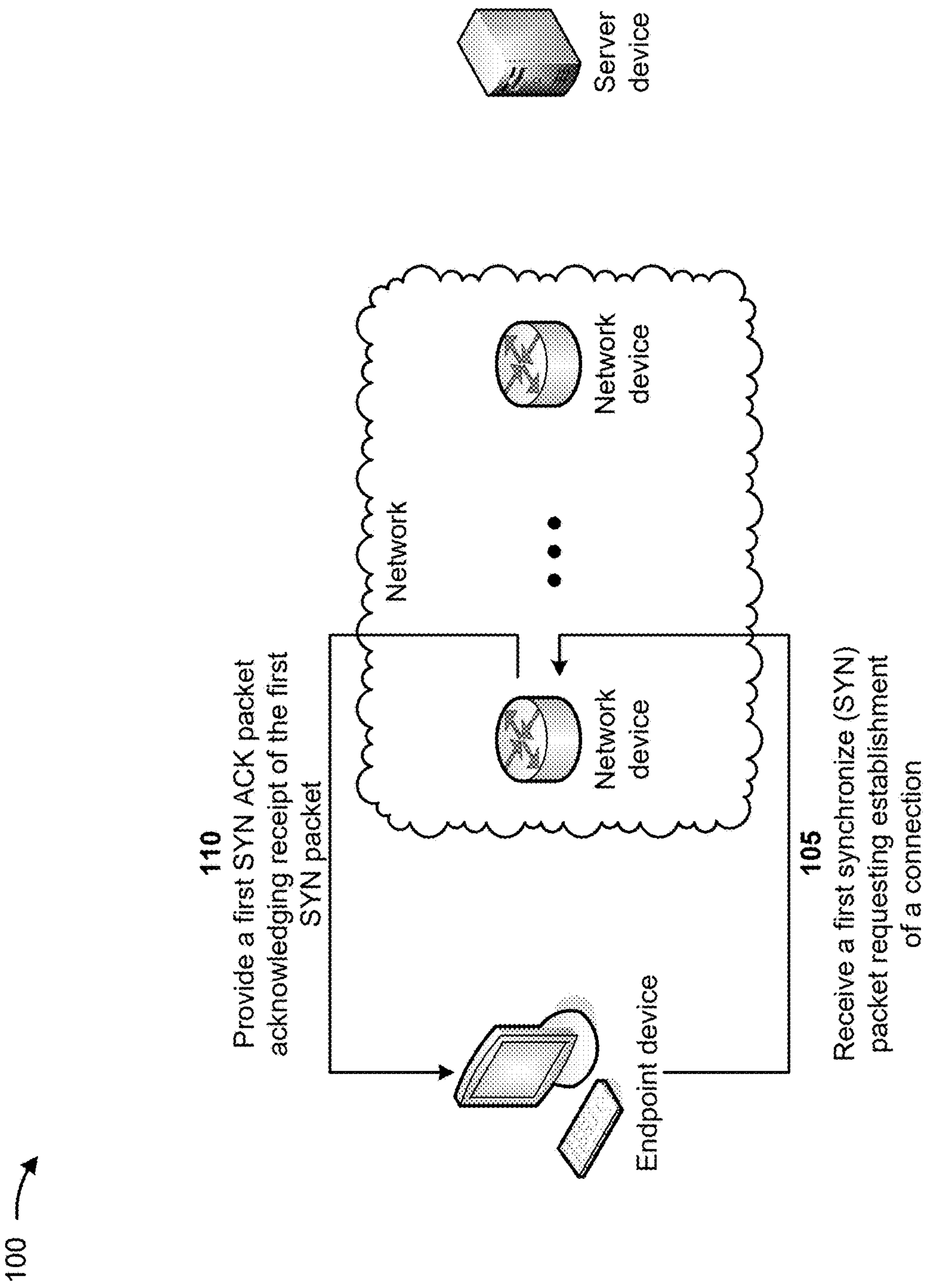
FIGS. 1A-1E are diagrams of an example associated with handling distributed denial-of-service attacks based on connect requests.

The following detailed description of example implementations refers to the accompanying drawings. The same reference numbers in different drawings may identify the same or similar elements.

A security service edge (SSE) provides secure access to data and resources with consistent security policies that follow users and devices without having to copy or recreate rule sets. The SSE may include a secure network device (e.g., a secure web gateway) that provides web traffic control through granular uniform resource locator (URL)-based policies, content inspection, selective secure sockets layer (SSL) decryption, and encrypted traffic insights to protect against web-based attacks even when decryption is impossible. The secure network device acts as an explicit web proxy and all client requests are directed towards the secure network device.

A hypertext transfer protocol (HTTP) connect method requests that a recipient establish a tunnel to a destination server identified by a request target. Tunnels are commonly used to create an end-to-end virtual connection, through one or more proxies, which can then be secured using transport layer security. When there is an explicit web proxy (e.g., the secure network device), client applications may attempt to connect to a port on the secure network device using the HTTP connect method. For example, an endpoint device may send an HTTP connect message to the secure network device and the secure network device may perform a domain name system (DNS) resolve on a host name (e.g., of a server device) provided in the connect message. The secure network device may initiate a session (e.g., a transmission control protocol (TCP) session) with the identified server device. Once the TCP session is established, the secure network device may provide a positive connect response to the endpoint device. A next message the secure network device may receive is an SSL message (e.g., a client hello) from the endpoint device. However, instead of initiating an SSL handshake, a malicious endpoint device may send a non-SSL message to perform a DDoS attack on the secure network device. The secure network device may handle the malicious endpoint device by terminating the TCP session with the endpoint device. This process may be repeated by the endpoint device and may expend all resources of the secure network device, such that valid network traffic can no longer be processed by the secure network device.

Thus, current techniques for handling DDoS attacks based on connect requests consume computing resources (e.g., processing resources, memory resources, communication resources, and/or the like), networking resources, and/or the like, associated with performing route lookups for traffic associated with DDoS attacks, performing policy lookups for traffic associated with DDoS attacks, performing DNS resolves of a server device host name for traffic associated with DDoS attacks, establishing TCP sessions with the server device for traffic associated with DDoS attacks, and/or the like.

Some implementations described herein relate to a network device that handles distributed denial-of-service attacks based on connect requests. For example, the network device may receive, from an endpoint device, a first synchronize packet requesting establishment of a connection, and may provide, to the endpoint device, a first synchronize acknowledgment packet acknowledging receipt of the first synchronize packet. The network device may receive, from the endpoint device, a first acknowledgment packet in response to the first synchronize acknowledgment packet and a connection request for connecting with a server device. The network device may provide, to the server device, a second synchronize packet requesting a connection with the server device, and may receive, from the server device, a second synchronize acknowledgment packet acknowledging receipt of the second synchronize packet. The network device may provide, to the server device, a second acknowledgment packet in response to the second synchronize acknowledgment packet, and may provide, to the endpoint device, a connection response indicating establishment of a session between the network device and the server device. The network device may receive, from the endpoint device, an SSL message or a non-SSL message, and may calculate a reputation score for the endpoint device based on whether the SSL message or the non-SSL message is received from the endpoint device.

In this way, the network device handles distributed denial-of-service attacks based on connect requests. For example, the network device may identify and mitigate a DDoS attack based on a reputation score associated with a network address (e.g., an Internet protocol (IP) address) of a malicious endpoint device. The reputation score for the network address of the malicious endpoint device may be updated for each abnormal access (e.g., a non-SSL access) by the malicious endpoint device. If the reputation score for the network address of the malicious endpoint device satisfies a threshold score, the network device may block the malicious endpoint device upon receipt of a TCP synchronization (SYN) packet from the malicious endpoint device. The network device may drop the TCP SYN packet before expending resources associated with route lookup, policy lookup, DNS resolve on a server device host name, and TCP session establishment with the server device. Thus, the network device conserves computing resources, networking resources, and/or the like that would otherwise have been consumed based on performing route lookups for traffic associated with DDoS attacks, performing policy lookups for traffic associated with DDoS attacks, performing DNS resolves of a server device host name for traffic associated with DDoS attacks, establishing TCP sessions with the server device for traffic associated with DDoS attacks, and/or the like.

FIGS. 1A-1E are diagrams of an example 100 associated with handling distributed denial-of-service attacks based on connect requests. As shown in FIGS. 1A-1E, example 100 includes an endpoint device and a server device associated with a network of network devices. Further details of the endpoint device, the server device, the network, and the network devices are provided elsewhere herein.

As shown in FIG. 1A, and by reference number 105, the network device may receive a first SYN packet requesting establishment of a connection. For example, the endpoint device may attempt to establish a connection with the network device in order to utilize the network device and the network to communicate with the server device. In order to establish the connection with the network device, the endpoint device may generate the first SYN packet (e.g., a TCP packet) and may provide the first SYN packet to the network device. The network device may receive the first SYN packet from the endpoint device. The first SYN packet may include a network address (e.g., an IP address) of the endpoint device and information requesting that a connection be established between the endpoint device and the network device.

As further shown in FIG. 1A, and by reference number 110, the network device may provide a first SYN acknowledgment (ACK) packet acknowledging receipt of the first SYN packet. For example, if the network device receives the first SYN packet, the network device may generate the first SYN ACK packet and may provide the first SYN ACK packet to the network address provided in the first SYN packet (e.g., the network address of the endpoint device).

The first SYN ACK packet may include information acknowledging receipt of the first SYN packet by the network device.

Figure 1B:
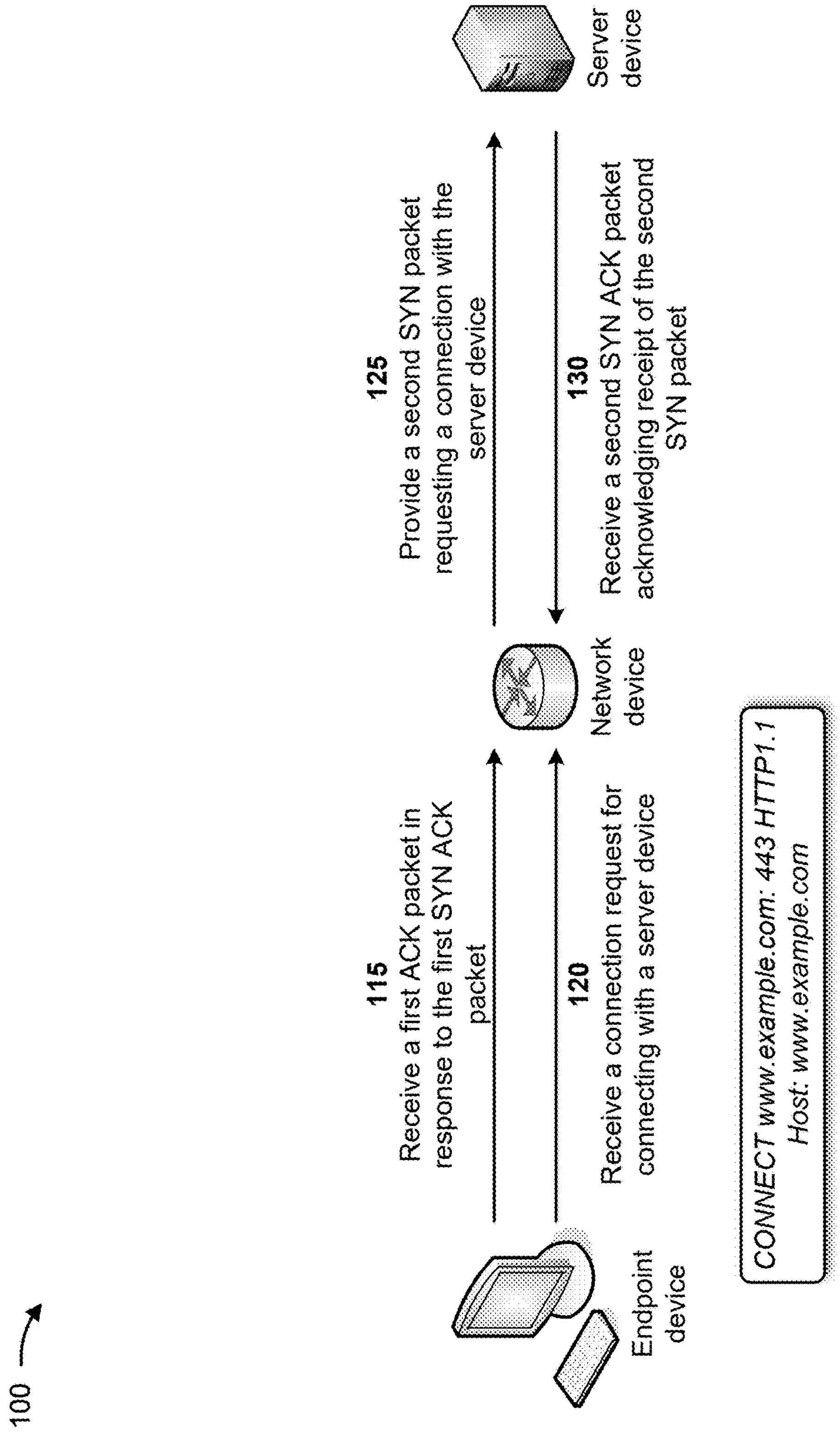

As shown in FIG. 1B, and by reference number 115, the network device may receive a first ACK packet in response to the first SYN ACK packet. For example, if the endpoint device receives the first SYN ACK packet from the network device, the endpoint device may generate a first ACK packet and may provide the first ACK packet to the network device. The network device may receive the first ACK packet from the endpoint device in response to the first SYN ACK packet. The first ACK packet may include information acknowledging receipt of the first SYN ACK packet by the endpoint device. At this point, a connection may be established between the network device and the endpoint device.

As further shown in FIG. 1B, and by reference number 120, the network device may receive a connection request for connecting with a server device. For example, the endpoint device may utilize an HTTP connect method requesting that the network device establish a tunnel to the server device identified by a request target generated by the endpoint device. A tunnel may be utilized to create an end-to-end virtual connection, through the network device, and may be secured using transport layer security. When there is an explicit web proxy (e.g., the network device), the endpoint device may attempt to connect to the network device using the HTTP connect method. In some implementations, the endpoint device may generate an HTTP connect message and may provide the HTTP connect message to the network device. The network device may receive the HTTP connect message from the endpoint device via the connection established between the endpoint device and the network device. The HTTP connect message may include information identifying a network address (e.g., an IP address) of the server device and a host name of the server device (e.g., CONNECT www.example.com: 443 HTTP1.1). The network device may perform a DNS resolve on the host name of the server device provided in the HTTP connect message. The network device may initiate a session (e.g., a TCP session) with the server device. Once the TCP session is established, the network device may provide a positive connection response to the endpoint device.

As further shown in FIG. 1B, and by reference number 125, the network device may provide a second SYN packet requesting a connection with the server device. For example, in order to establish the connection with the server device, the network device may generate a second SYN packet and may provide the second SYN packet to the server device. The second SYN packet may include a network address (e.g., an IP address) of the network device and information requesting that a connection be established between the network device and the server device.

As further shown in FIG. 1B, and by reference number 130, the network device may receive a second SYN ACK packet acknowledging receipt of the second SYN packet. For example, if the server device receives the second SYN packet, the server device may generate the second SYN ACK packet and may provide the second SYN ACK packet to the network address provided in the second SYN packet (e.g., the network address of the network device). The network device may receive the second SYN ACK packet from the server device. The second SYN ACK packet may include information acknowledging receipt of the second SYN packet by the server device.

Figure 1C:
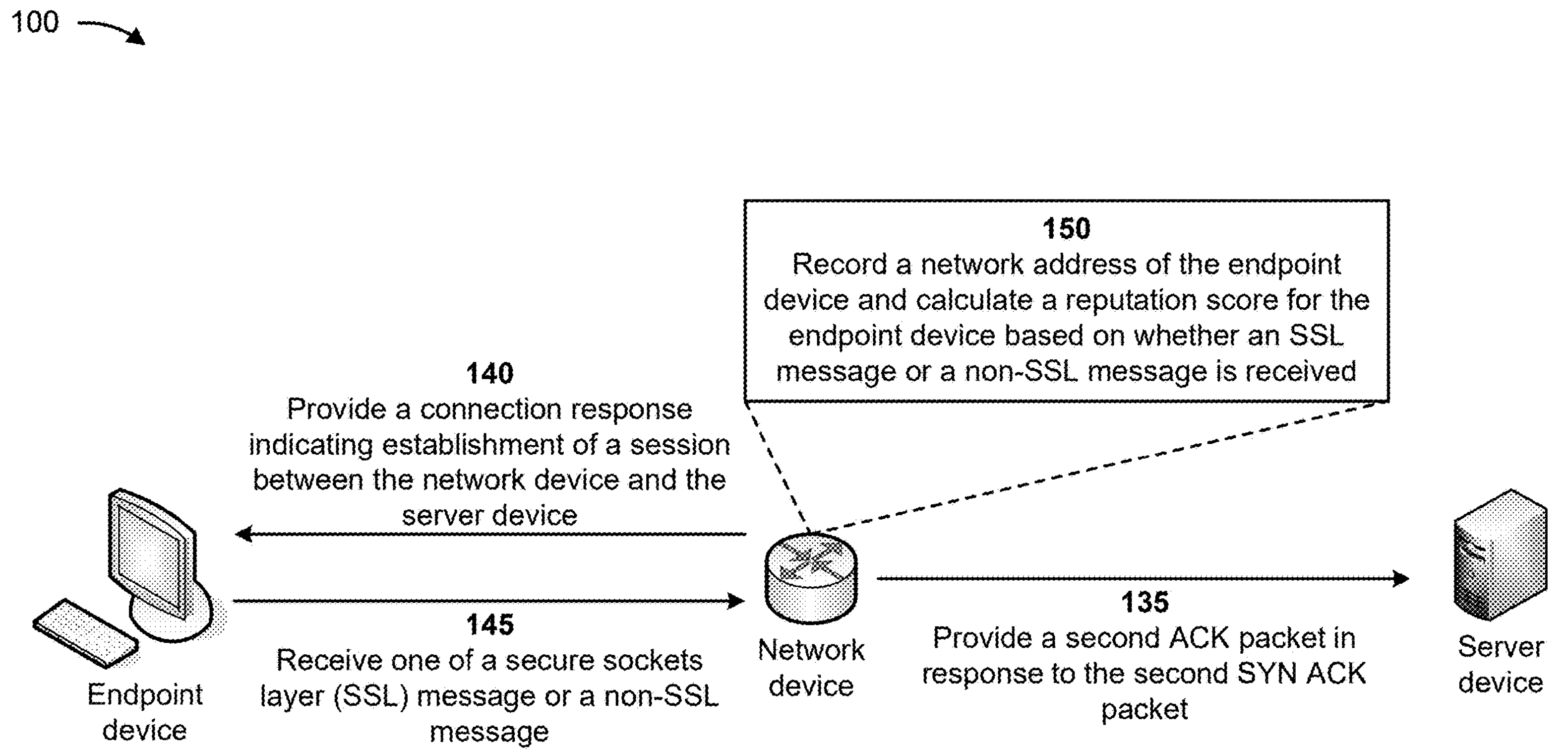

As shown in FIG. 1C, and by reference number 135, the network device may provide a second ACK packet in response to the second SYN ACK packet. For example, if the network device receives the second SYN ACK packet from the server device, the network device may generate a second ACK packet and may provide the second ACK packet to the server device. The server device may receive the second ACK packet from the network device in response to the second SYN ACK packet. The second ACK packet may include information acknowledging receipt of the second SYN ACK packet by the network device. At this point, a connection may be established between the network device and the server device.

As further shown in FIG. 1C, and by reference number 140, the network device may provide a connection response indicating establishment of a session between the network device and the server device. For example, once the connection is established between the network device and the server device, the network device may generate the connection response (e.g., a 200 OK response) and may provide the connection response to the endpoint device. The connection response may include information indicating establishment of the session between the network device and the server device.

As further shown in FIG. 1C, and by reference number 145, the network device may receive one of an SSL message or a non-SSL message. For example, if the endpoint device is a non-malicious endpoint device (e.g., not performing a DDoS attack), the endpoint device may generate an SSL message (e.g., client hello) to initiate an SSL handshake with the server device and may provide the SSL message to the network device. The network device may receive the SSL message from the non-malicious endpoint device. Alternatively, if the endpoint device is a malicious endpoint device (e.g., performing a DDoS attack), the endpoint device may generate a non-SSL message to perform a DDoS attack on the network device and may provide the non-SSL message to the network device. The network device may receive the non-SSL message from the endpoint device. The network device may handle the malicious endpoint device by terminating the TCP session with the endpoint device. However, this process may be repeated by the endpoint device and may expend all resources of the network device, such that valid network traffic can no longer be processed by the network device.

As further shown in FIG. 1C, and by reference number 150, the network device may record a network address of the endpoint device and may calculate a reputation score for the endpoint device based on whether an SSL message or a non-SSL message is received. For example, in order to prevent the malicious endpoint device from performing a DDoS attack on the network device, the network device may record or store the network address of the endpoint device in a data structure (e.g., a database, a table, a list, and/or the like) associated with the network device. The network device may also calculate a reputation score for the endpoint device based on whether an SSL message or a non-SSL message is received from the endpoint device. In one example, if the SSL message is received from the endpoint device, the network device may calculate a high reputation score for the endpoint device since the endpoint device may be trustworthy and not malicious. If the non-SSL message is received from the endpoint device, the network device may calculate a low reputation score (e.g., lower than the reputation score calculated based on receipt of the SSL message) for the endpoint device since the endpoint device may be malicious.

The network device may associate the reputation score associated with the network address (e.g., the IP address) of the endpoint device. The network device may update the reputation score for the network address of the endpoint device for each abnormal access (e.g., a non-SSL access) by the endpoint device. If the reputation score for the network address of the endpoint device satisfies a threshold score (e.g., is below a particular score), the network device may determine the endpoint device to be malicious and may block the malicious endpoint device upon receipt of a TCP SYN packet from the malicious endpoint device. The network device may drop the TCP SYN packet before expending resources associated with route lookup, policy lookup, DNS resolve on the server device host name, and TCP session establishment with the server device.

Figure 1D:
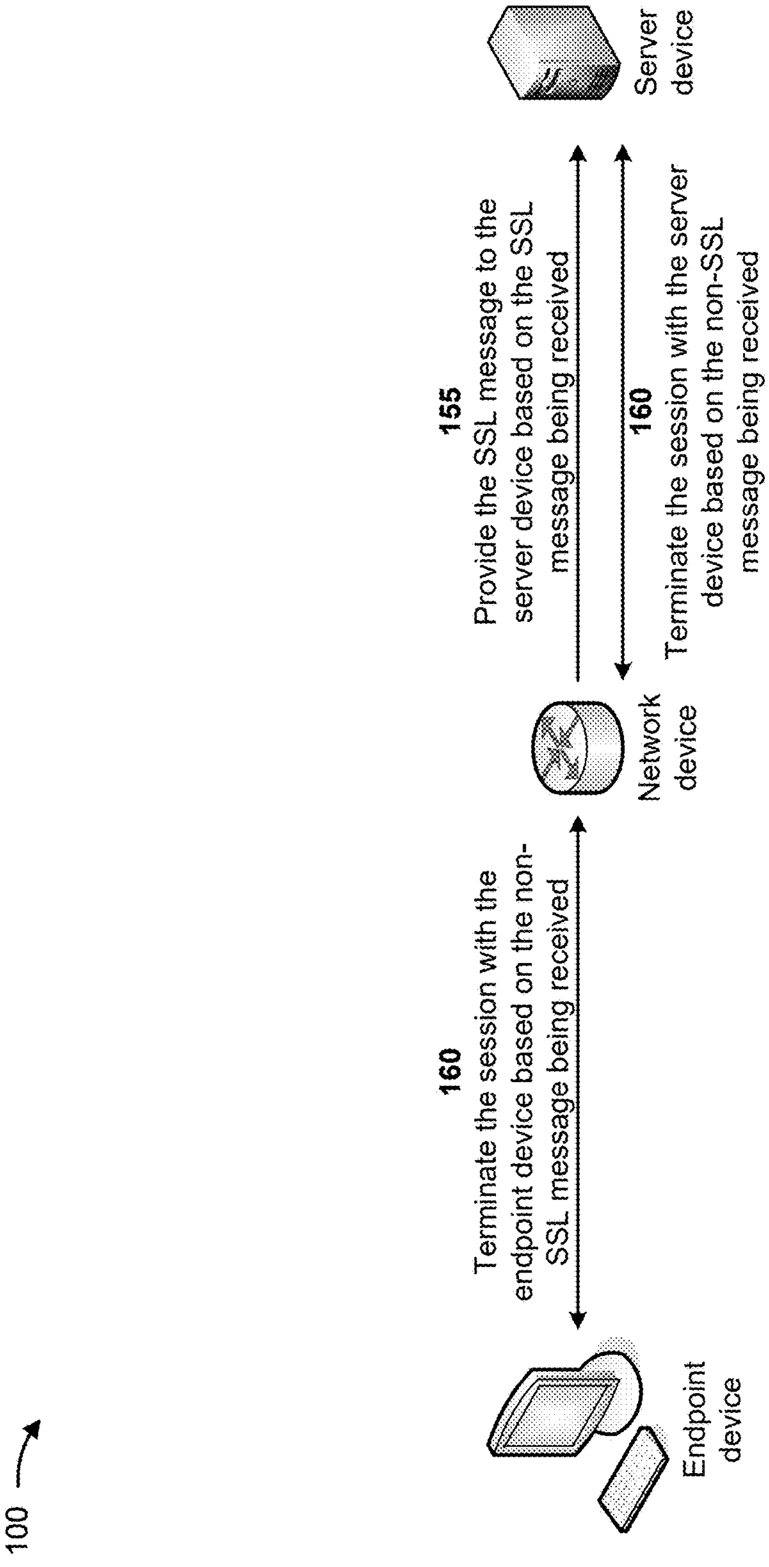

As shown in FIG. 1D, and by reference number 155, the network device may provide the SSL message to the server device based on the SSL message being received. For example, if the SSL message is received from the endpoint device, the network device may determine that the endpoint device is not malicious and may forward the SSL message to the server device. In some implementations, the network device may determine whether the reputation score for the network address of the endpoint device satisfies a threshold score prior to forwarding the SSL message to the server device. For example, if the reputation score for the network address of the endpoint device fails to satisfy the threshold score (e.g., is above the particular score), the network device may determine that the endpoint device is not malicious and may provide the SSL message to the server device.

As further shown in FIG. 1D, and by reference number 160, the network device may terminate the sessions with the endpoint device and the server device based on the non-SSL message being received. For example, if the non-SSL message is received from the endpoint device, the network device may determine that the endpoint device is malicious and may update the reputation score for the network address of the endpoint device. The network device may terminate the sessions with the endpoint device and the server device based on determining that the endpoint device is malicious. The network device may also determine that the endpoint device is malicious based on the calculated reputation score for the network address of the endpoint device. Thus, the network device may terminate the sessions with the endpoint device and the server device based on the reputation score for the network address of the endpoint device.

Figure 1E:
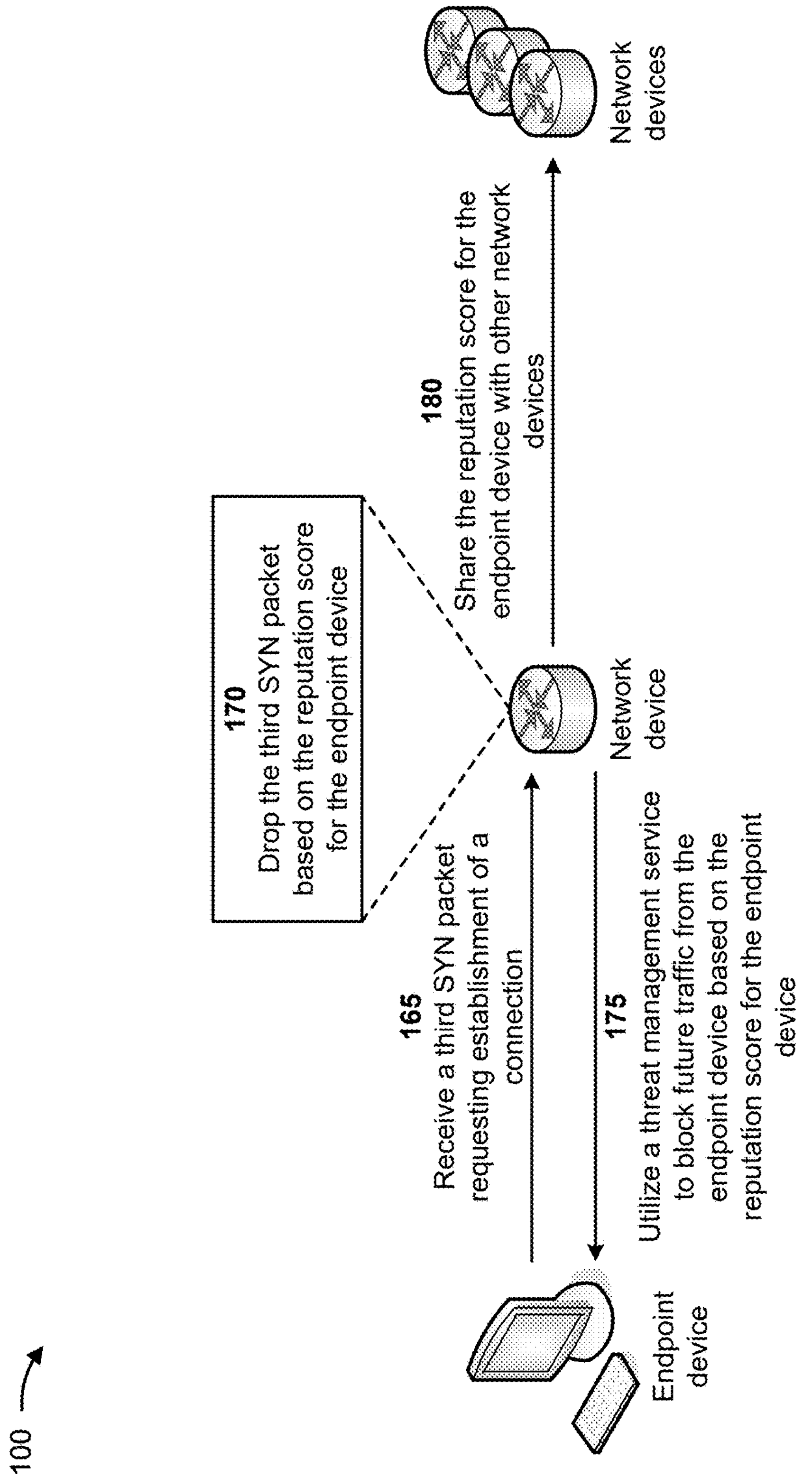

As shown in FIG. 1E, and by reference number 165, the network device may receive a third SYN packet requesting establishment of a connection. For example, the endpoint device may attempt to establish another connection with the network device in order to perform a DDoS attack on the network device. In order to establish the connection with the network device, the endpoint device may generate the third SYN packet (e.g., a TCP packet) and may provide the third SYN packet to the network device. The network device may receive the third SYN packet from the endpoint device. The third SYN packet may include the network address (e.g., an IP address) of the endpoint device and information requesting that a connection be established between the endpoint device and the network device.

As further shown in FIG. 1E, and by reference number 170, the network device may drop the third SYN packet based on the reputation score for the endpoint device. For example, if the reputation score for the network address of the endpoint device satisfies a threshold score (e.g., is below a particular score), the network device may determine the endpoint device to be malicious and may block the malicious endpoint device upon receipt of a future SYN packet (e.g., the third SYN packet) from the malicious endpoint device. The network device may drop the third SYN packet before expending resources associated with route lookup, policy lookup, DNS resolve on the server device host name, and TCP session establishment with the server device. The network device may integrate DDoS mitigation of the endpoint device with a threat management service so that identification of the malicious endpoint device may be performed at the TCP SYN packet level.

As further shown in FIG. 1E, and by reference number 175, the network device may utilize a threat management service to block future traffic from the endpoint device based on the reputation score for the endpoint device. For example, if the reputation score for the network address of the endpoint device satisfies a threshold score (e.g., is below a particular score), the network device may determine the endpoint device to be malicious and may provide the network address of the malicious endpoint device to a threat management service. The threat management service may utilize the network address of the malicious endpoint device to block future traffic associated with the network address of the malicious endpoint device.

As further shown in FIG. 1E, and by reference number 180, the network device may share the reputation score for the endpoint device with other network devices. For example, if the reputation score for the network address of the endpoint device satisfies a threshold score (e.g., is below a particular score), the network device may determine the endpoint device to be malicious and may provide the reputation score for the endpoint device to other network devices of the network. The network device may also provide the network address of the malicious endpoint device to the other network devices. The other network device may utilize the network address of the malicious endpoint device to block future traffic associated with the network address of the malicious endpoint device.

In case of cloud deployments, the network address of the malicious endpoint device identified by one virtual network device at point of presence location may be shared across other virtual network device instances in the same point of presence location as well across different point of presence locations. This may enable the virtual network device instances to mitigate a DDoS attack at the TCP SYN packet level and may conserve resources associated with identifying the malicious endpoint device at each virtual network device instance.

In this way, the network device handles distributed denial-of-service attacks based on connect requests. For example, the network device may identify and mitigate a DDoS attack based on a reputation score associated with a network address (e.g., an IP address) of a malicious endpoint device. The reputation score for the network address of the malicious endpoint device may be updated for each abnormal access (e.g., a non-SSL access) by the malicious endpoint device. If the reputation score for the network address of the malicious endpoint device satisfies a threshold score, the network device may block the malicious endpoint device upon receipt of a TCP SYN packet from the malicious endpoint device. The network device may drop the TCP SYN packet before expending resources associated with route lookup, policy lookup, DNS resolve on a server device host name, and TCP session establishment with the server device. Thus, the network device conserves computing resources, networking resources, and/or the like that would otherwise have been consumed based on performing route lookups for traffic associated with DDoS attacks, performing policy lookups for traffic associated with DDoS attacks, performing DNS resolves of a server device host name for traffic associated with DDoS attacks, establishing TCP sessions with the server device for traffic associated with DDoS attacks, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
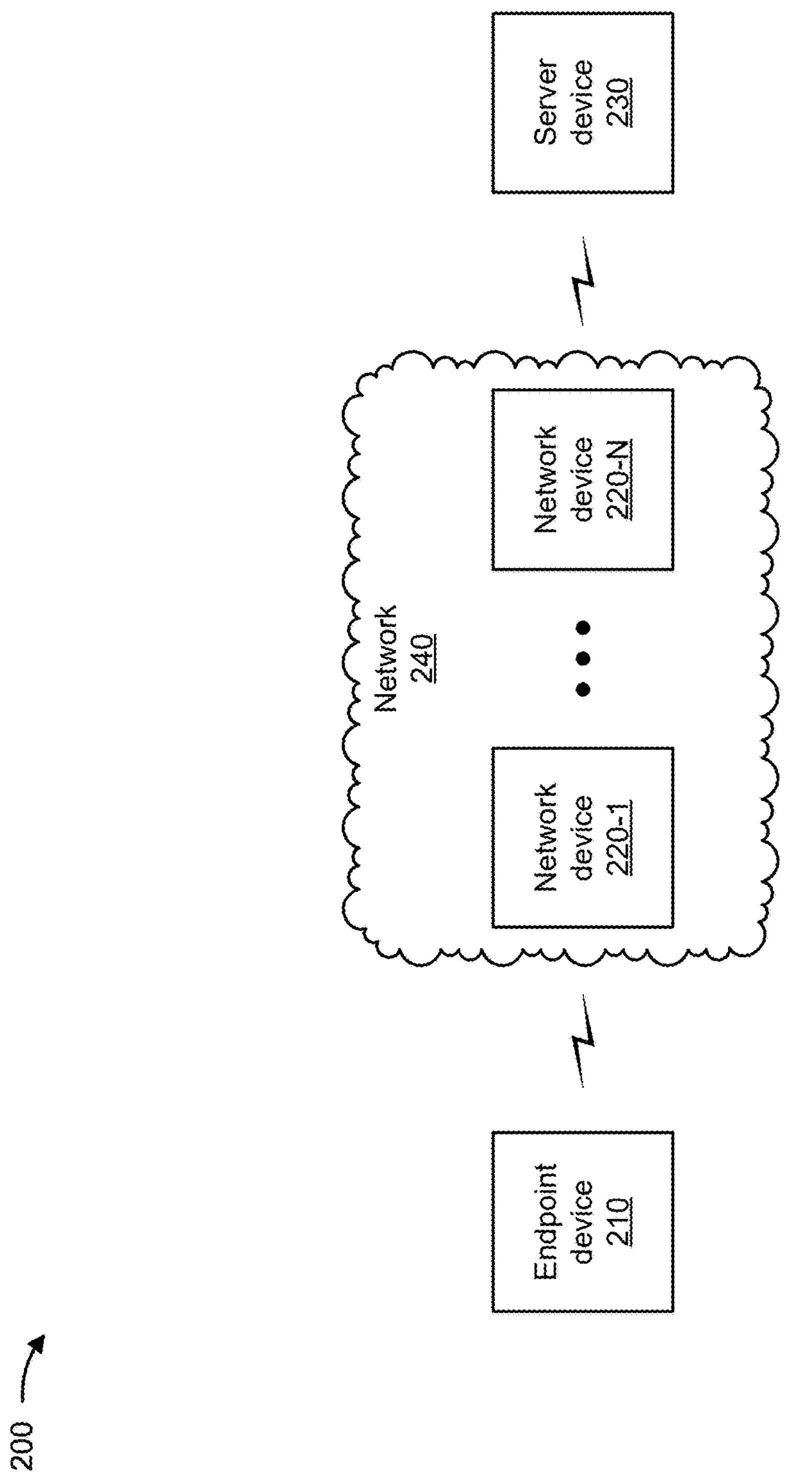
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 includes one or more devices capable of receiving, generating, storing, processing, and/or providing information, such as information described herein. For example, the server device 230 may include a laptop computer, a tablet computer, a desktop computer, a group of server devices, or a similar type of device, associated with multicast traffic. In some implementations, the server device 230 may receive information from and/or transmit information (e.g., multicast traffic) to the endpoint device 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
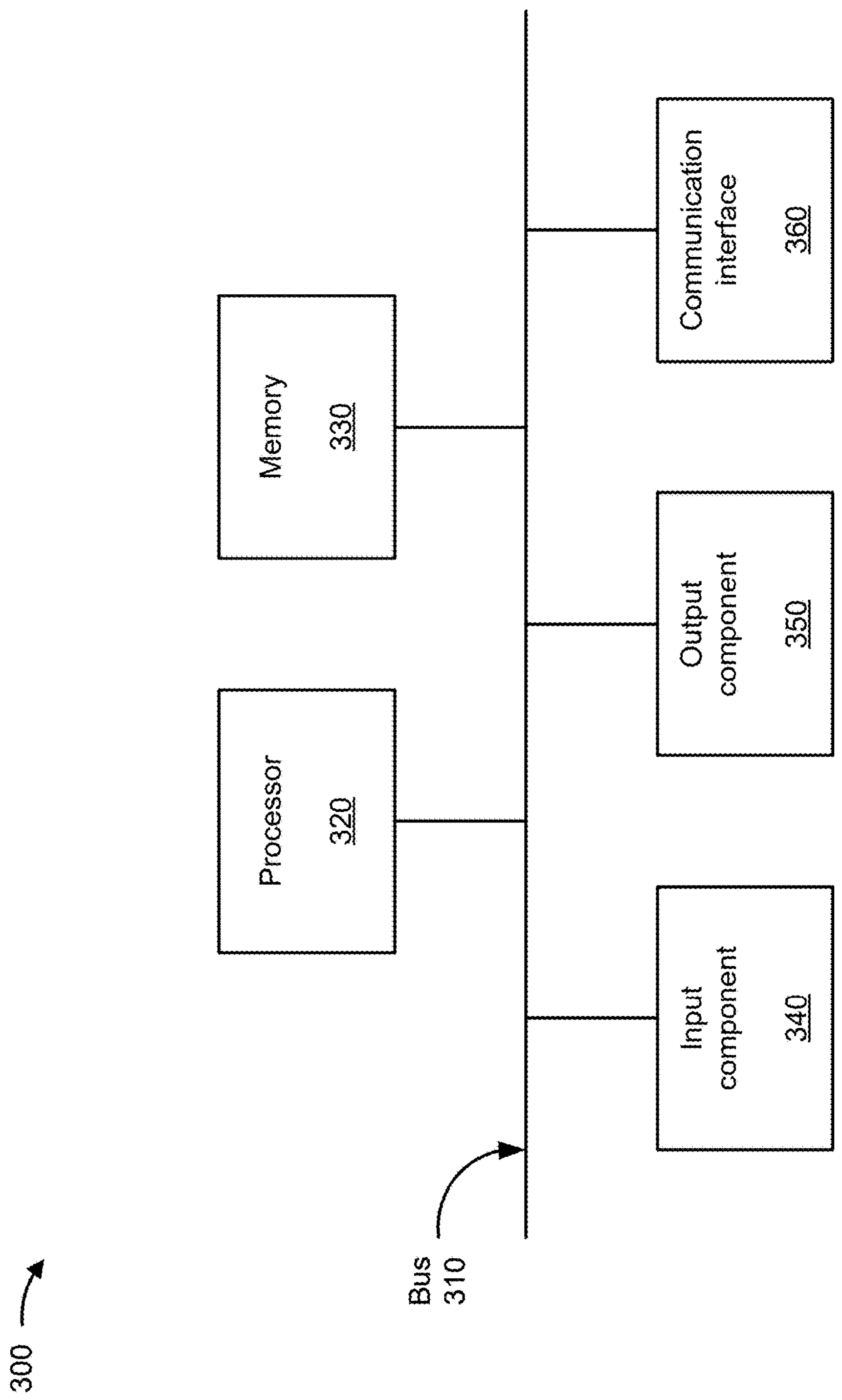
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
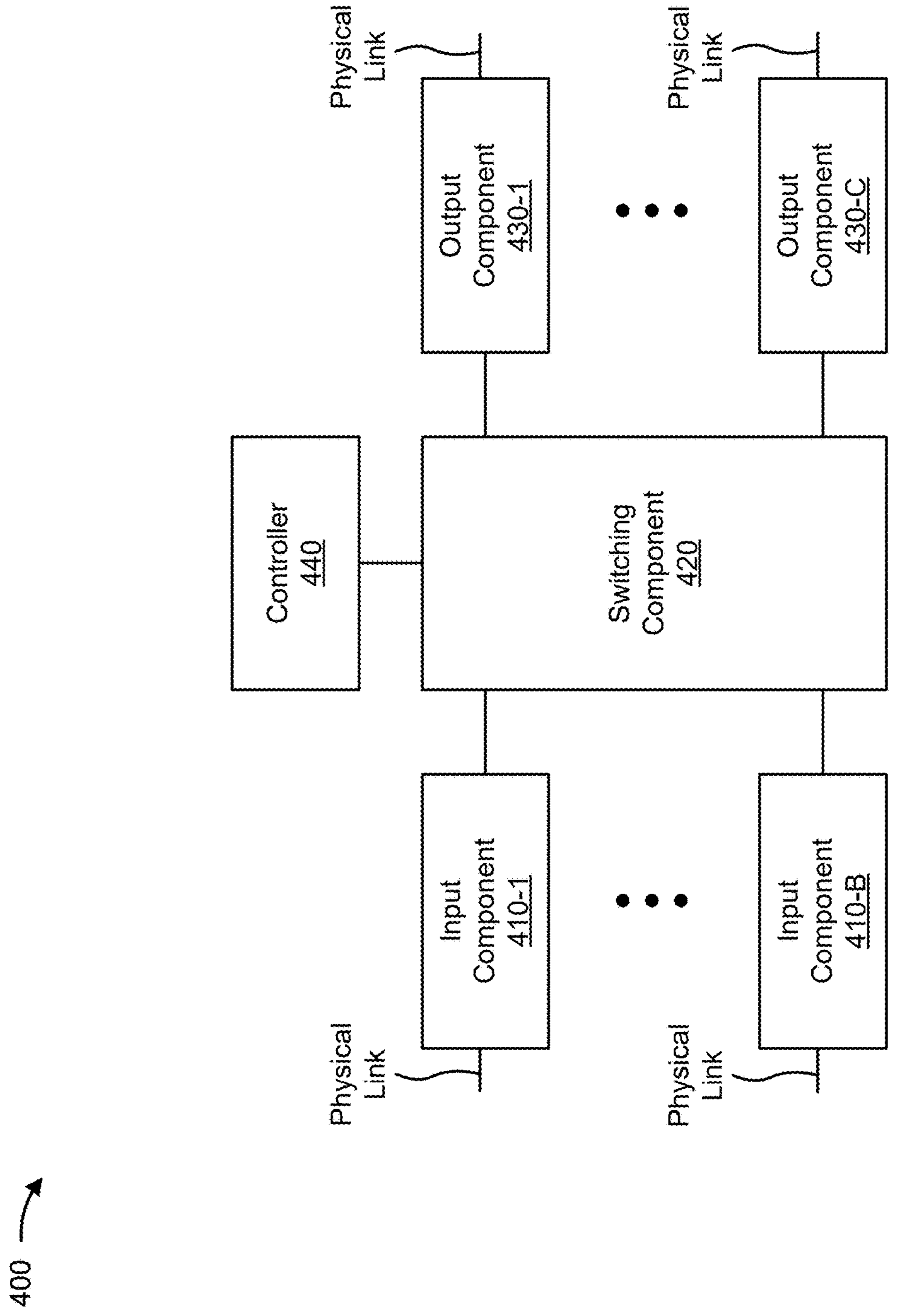

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
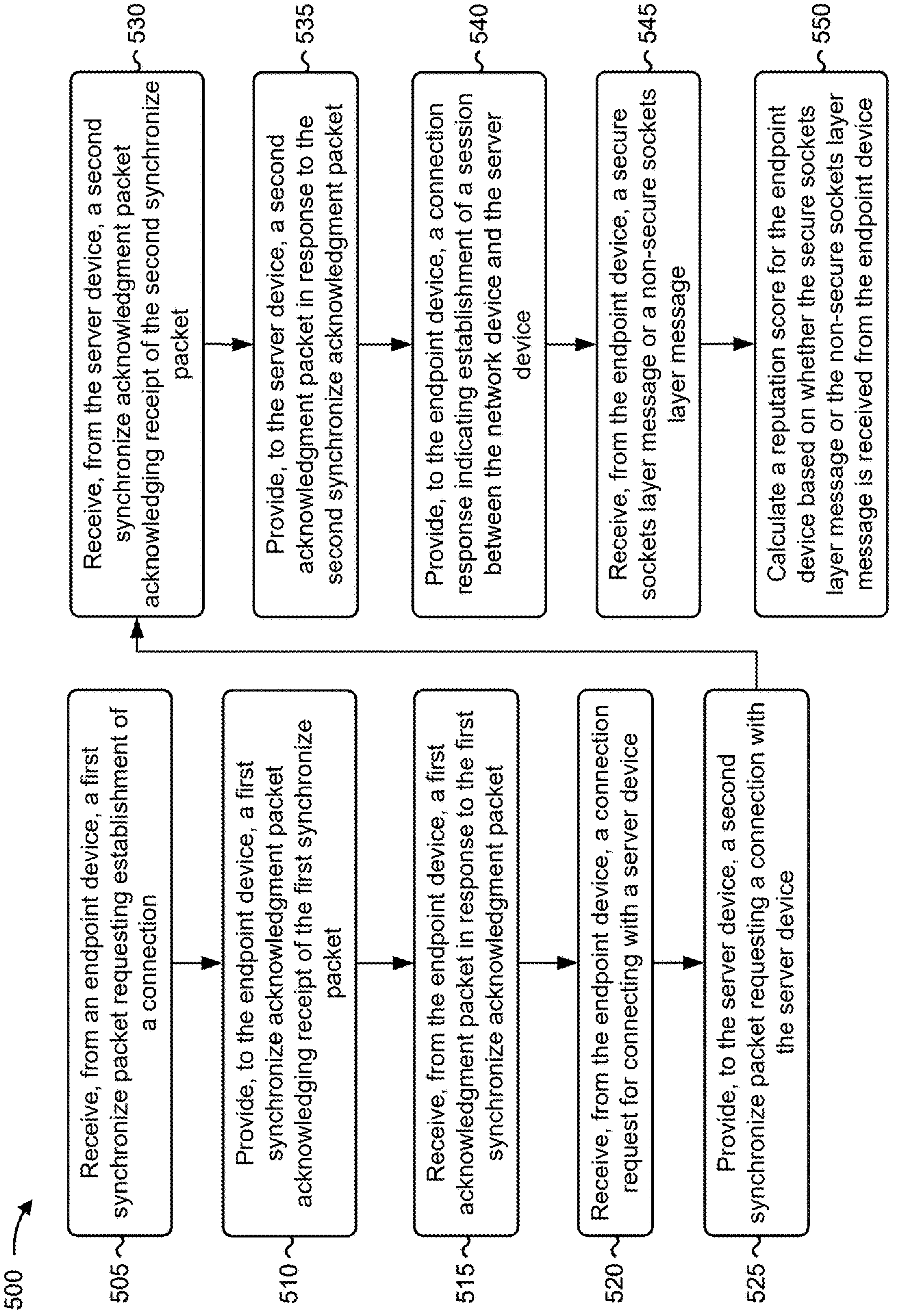
FIG. 5 is a flowchart of an example process for handling distributed denial-of-service attacks based on connect requests.

FIG. 5 is a flowchart of an example process 500 for handling distributed denial-of-service attacks based on connect requests. In some implementations, one or more process blocks of FIG. 5 may be performed by a network device (e.g., the network device 220). In some implementations, one or more process blocks of FIG. 5 may be performed by another device or a group of devices separate from or including the network device, such as a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, THE switching component 420, the output component 430, and/or the controller 440.

As shown in FIG. 5, process 500 may include receiving, from an endpoint device, a first synchronize packet requesting establishment of a connection (block 505). For example, the network device may receive, from an endpoint device, a first synchronize packet requesting establishment of a connection, as described above.

As further shown in FIG. 5, process 500 may include providing, to the endpoint device, a first synchronize acknowledgment packet acknowledging receipt of the first synchronize packet (block 510). For example, the network device may provide, to the endpoint device, a first synchronize acknowledgment packet acknowledging receipt of the first synchronize packet, as described above.

As further shown in FIG. 5, process 500 may include receiving, from the endpoint device, a first acknowledgment packet in response to the first synchronize acknowledgment packet (block 515). For example, the network device may receive, from the endpoint device, a first acknowledgment packet in response to the first synchronize acknowledgment packet, as described above.

As further shown in FIG. 5, process 500 may include receiving, from the endpoint device, a connection request for connecting with a server device (block 520). For example, the network device may receive, from the endpoint device, a connection request for connecting with a server device, as described above. In some implementations, the network device is a web proxy for a cloud computing environment associated with the server device.

As further shown in FIG. 5, process 500 may include providing, to the server device, a second synchronize packet requesting a connection with the server device (block 525). For example, the network device may provide, to the server device, a second synchronize packet requesting a connection with the server device, as described above.

As further shown in FIG. 5, process 500 may include receiving, from the server device, a second synchronize acknowledgment packet acknowledging receipt of the second synchronize packet (block 530). For example, the network device may receive, from the server device, a second synchronize acknowledgment packet acknowledging receipt of the second synchronize packet, as described above.

As further shown in FIG. 5, process 500 may include providing, to the server device, a second acknowledgment packet in response to the second synchronize acknowledgment packet (block 535). For example, the network device may provide, to the server device, a second acknowledgment packet in response to the second synchronize acknowledgment packet, as described above.

As further shown in FIG. 5, process 500 may include providing, to the endpoint device, a connection response indicating establishment of a session between the network device and the server device (block 540). For example, the network device may provide, to the endpoint device, a connection response indicating establishment of a session between the network device and the server device, as described above.

As further shown in FIG. 5, process 500 may include receiving, from the endpoint device, a secure sockets layer message or a non-secure sockets layer message (block 545). For example, the network device may receive, from the endpoint device, a secure sockets layer message or a non-secure sockets layer message, as described above. In some implementations, the secure sockets layer message initiates a secure sockets layer handshake. In some implementations, the non-secure sockets layer message is associated with a distributed denial-of-service attack by the endpoint device.

As further shown in FIG. 5, process 500 may include calculating a reputation score for the endpoint device based on whether the secure sockets layer message or the non-secure sockets layer message is received from the endpoint device (block 550). For example, the network device may calculate a reputation score for the endpoint device based on whether the secure sockets layer message or the non-secure sockets layer message is received from the endpoint device, as described above.

In some implementations, process 500 includes recording, by the network device, a network address of the endpoint device. In some implementations, process 500 includes providing the secure sockets layer message to the server device based on the secure sockets layer message being received. In some implementations, process 500 includes terminating the sessions with the endpoint device and the server device based on the non-secure sockets layer message being received.

In some implementations, process 500 includes receiving, from the endpoint device, a third synchronize packet requesting establishment of a connection, and dropping the third synchronize packet based on the reputation score for the endpoint device. In some implementations, process 500 includes utilizing a threat management service to block future traffic from the endpoint device based on the reputation score for the endpoint device. In some implementations, process 500 includes sharing the reputation score for the endpoint device with other network devices. In some implementations, process 500 includes identifying the endpoint device as malicious based on the reputation score for the endpoint device.

In some implementations, process 500 includes terminating the sessions with the endpoint device and the server device based on the non-secure sockets layer message being received, and blocking future traffic from the endpoint device based on the reputation score for the endpoint device. In some implementations, process 500 includes terminating the sessions with the endpoint device and the server device based on the non-secure sockets layer message being received, and identifying the endpoint device as malicious based on the reputation score for the endpoint device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network device and from an endpoint device, a first synchronize packet requesting establishment of a connection;

providing, by the network device and to the endpoint device, a first synchronize acknowledgment packet acknowledging receipt of the first synchronize packet;

receiving, by the network device and from the endpoint device, a first acknowledgment packet in response to the first synchronize acknowledgment packet;

receiving, by the network device and from the endpoint device, a connection request for connecting with a server device;

providing, by the network device and to the server device, a second synchronize packet requesting a connection with the server device;

receiving, by the network device and from the server device, a second synchronize acknowledgment packet acknowledging receipt of the second synchronize packet;

providing, by the network device and to the server device, a second acknowledgment packet in response to the second synchronize acknowledgment packet;

providing, by the network device and to the endpoint device, a connection response indicating establishment of a session between the network device and the server device;

receiving, by the network device and from the endpoint device, a secure sockets layer message or a non-secure sockets layer message; and calculating, by the network device, a reputation score for the endpoint device based on whether the secure sockets layer message or the non-secure sockets layer message is received from the endpoint device, wherein receipt of the secure sockets layer message results in a higher reputation score than receipt of the non-secure sockets layer message.

2. The method of claim 1, further comprising:

recording, by the network device, a network address of the endpoint device.

3. The method of claim 1, further comprising:

providing the secure sockets layer message to the server device based on the secure sockets layer message being received.

4. The method of claim 1, further comprising:

terminating sessions with the endpoint device and the server device based on the non-secure sockets layer message being received.

5. The method of claim 1, further comprising:

receiving, from the endpoint device, a third synchronize packet requesting establishment of a connection; and dropping the third synchronize packet based on the reputation score for the endpoint device.

6. The method of claim 1, further comprising:

utilizing a threat management service to block future traffic from the endpoint device based on the reputation score for the endpoint device.

7. The method of claim 1, further comprising:

sharing the reputation score for the endpoint device with other network devices.

8. A network device, comprising:

one or more memories; and one or more processors to:

receive, from an endpoint device, a first synchronize packet requesting establishment of a connection;

provide, to the endpoint device, a first synchronize acknowledgment packet acknowledging receipt of the first synchronize packet;

receive, from the endpoint device, a first acknowledgment packet in response to the first synchronize acknowledgment packet;

receive, from the endpoint device, a connection request for connecting with a server device;

provide, to the server device, a second synchronize packet requesting a connection with the server device;

receive, from the server device, a second synchronize acknowledgment packet acknowledging receipt of the second synchronize packet;

provide, to the server device, a second acknowledgment packet in response to the second synchronize acknowledgment packet;

provide, to the endpoint device, a connection response indicating establishment of a session between the network device and the server device;

receive, from the endpoint device, a secure sockets layer message or a non-secure sockets layer message;

record a network address of the endpoint device; and calculate a reputation score for the endpoint device based on whether the secure sockets layer message or the non-secure sockets layer message is received from the endpoint device and based on the network address of the endpoint device, wherein receipt of the secure sockets layer message results in a higher reputation score than receipt of the non-secure sockets layer message.

9. The network device of claim 8, wherein the one or more processors are further to:

identify the endpoint device as malicious based on the reputation score for the endpoint device.

10. The network device of claim 8, wherein the network device is a web proxy for a cloud computing environment associated with the server device.

11. The network device of claim 8, wherein the secure sockets layer message initiates a secure sockets layer handshake.

12. The network device of claim 8, wherein the non-secure sockets layer message is associated with a distributed denial-of-service attack by the endpoint device.

13. The network device of claim 8, wherein the one or more processors are further to:

terminate sessions with the endpoint device and the server device based on the non-secure sockets layer message being received; and block future traffic from the endpoint device based on the reputation score for the endpoint device.

14. The network device of claim 8, wherein the one or more processors are further to:

terminate sessions with the endpoint device and the server device based on the non-secure sockets layer message being received; and identify the endpoint device as malicious based on the reputation score for the endpoint device.

15. A non-transitory computer-readable medium storing a set of instructions, the set of instructions comprising:

one or more instructions that, when executed by one or more processors of a network device, cause the network device to:

receive, from an endpoint device, a first synchronize packet requesting establishment of a connection;

provide, to the endpoint device, a first synchronize acknowledgment packet acknowledging receipt of the first synchronize packet;

receive, from the endpoint device, a first acknowledgment packet in response to the first synchronize acknowledgment packet;

receive, from the endpoint device, a connection request for connecting with a server device;

provide, to the server device, a second synchronize packet requesting a connection with the server device;

receive, from the server device, a second synchronize acknowledgment packet acknowledging receipt of the second synchronize packet;

provide, to the server device, a second acknowledgment packet in response to the second synchronize acknowledgment packet;

provide, to the endpoint device, a connection response indicating establishment of a session between the network device and the server device;

receive, from the endpoint device, a non-secure sockets layer message;

terminate sessions with the endpoint device and the server device based on receiving the non-secure sockets layer message from the endpoint device; and calculate a reputation score for the endpoint device based on receiving the non-secure sockets layer message from the endpoint device, wherein receipt of the secure sockets layer message results in a higher reputation score than receipt of the non-secure sockets layer message.

16. The non-transitory computer-readable medium of claim 15, wherein the one or more instructions further cause the network device to:

receive, from the endpoint device, a third synchronize packet requesting establishment of a connection; and drop the third synchronize packet based on the reputation score for the endpoint device.

17. The non-transitory computer-readable medium of claim 15, wherein the one or more instructions further cause the network device to:

utilize a threat management service to block future traffic from the endpoint device based on the reputation score for the endpoint device.

18. The non-transitory computer-readable medium of claim 15, wherein the one or more instructions further cause the network device to:

share the reputation score for the endpoint device with other network devices.

19. The non-transitory computer-readable medium of claim 15, wherein the one or more instructions further cause the network device to:

identify the endpoint device as malicious based on the reputation score for the endpoint device.

20. The non-transitory computer-readable medium of claim 15, wherein the non-secure sockets layer message is associated with a distributed denial-of-service attack by the endpoint device.

* * * * *